Feb. 16, 1943.     M. KRAUSE     2,311,495
TREE BRACKET
Filed Aug. 11, 1941
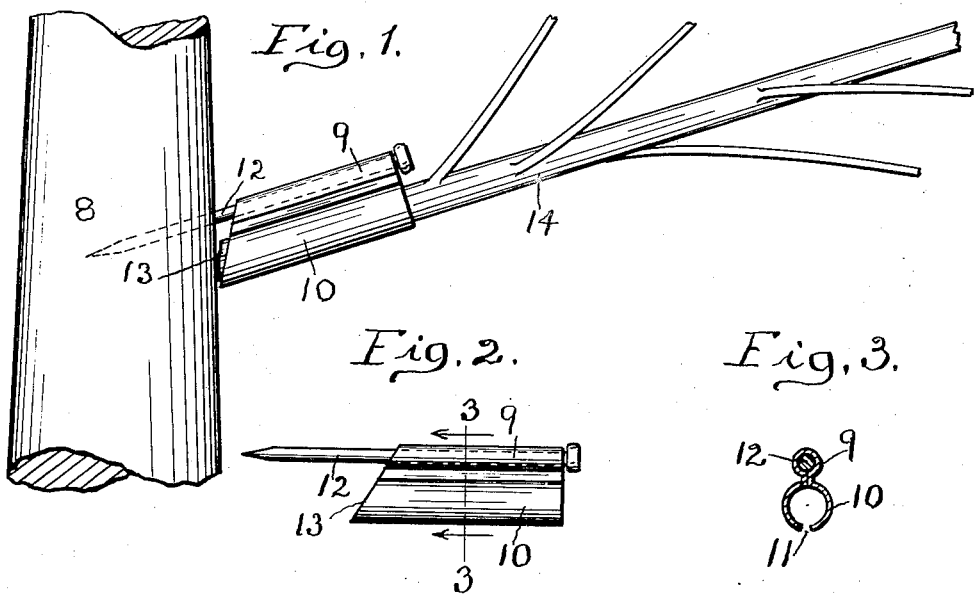
INVENTOR.
Max Krause
BY J. M. Roberts
ATTORNEY.

Patented Feb. 16, 1943

2,311,495

UNITED STATES PATENT OFFICE 2,311,495

TREE BRACKET

Max Krause, Chicago, Ill.

Application August 11, 1941, Serial No. 406,419

1 Claim. (Cl. 248—42)

My invention consists of a small bracket provided with means for securing the same to the trunk or a branch of a tree and designed to be of a form to hold the inner end of a branch taken from the same tree or from another tree to fill in a space or vacancy to make the tree appear more symmetrical and natural. It often occurs that trees, especially Christmas trees which are used for decorations or ornaments, are not provided with a sufficient number or arrangement of branches, and one object of this invention is to enable the decorator or user to provide a more attractive tree. My device may be used to secure branches or other small objects to a vertical wall or other support for decorative purposes or for any other uses.

My bracket or support may be made of sheet metal bent into proper shape, or fiber or any other resilient material so long as it is of a form to support the end of a branch or other material. Also the means of securing the same to the trunk or other support of a tree may be a nail, a screw or any other convenient means. To show my invention so that others may be able to make and use the same, I have illustrated it on the accompanying sheet of drawings in which:

Fig. 1 is a side elevation of the trunk of a tree having a bracket secured to it and a branch secured in the bracket; Fig. 2 is a side elevation of the same bracket removed from the tree; and Fig. 3 is a sectional view on the line 3—3 of Fig. 2.

Referring to the drawing, the tree trunk or other support is shown at 8, and the bracket is made of a strip of resilient sheet metal bent on its central longitudinal line into opposite wings of equal dimensions. The wings are formed at their upper portions into a small longitudinal cylindrical closed seat 9 for the fastening element 12, and their lower portions are formed into a larger longitudinal cylindrical seat 10 for the tree-branch 14. The free edges of the wings are slightly separated to form a slot 11 extending longitudinally of the seat 10 as shown in Fig. 3 to give it a resilient or spring action to grip the stems of branches of different sizes. A nail 12, or a screw, extends through the small cylindrical portion 9 and has its inner end mounted in the tree trunk 8 as shown in Fig. 1. The end of the bracket next to the tree trunk is preferably cut on a slant as at 13 to form a brace against the tree trunk to support the branch 14 at an upward tilt, as clearly shown in Fig. 1.

I claim:

A bracket for the purposes described consisting of a strip of resilient material bent on its central longitudinal line into opposite wings of equal dimensions, the upper portions of said wings being formed to provide a longitudinal closed seat for a supporting element, and the lower portions of said wings being formed to provide a longitudinal cylindrical seat having a slot in its lower portion whereby the edges of the wings have a flexible spring action to grip the stems of tree-branches of different sizes, and an end of the bracket being formed on a slant to support the bracket at an upward tilt.

MAX KRAUSE.